(12) United States Patent
Miki et al.

(10) Patent No.: US 12,540,913 B2
(45) Date of Patent: Feb. 3, 2026

(54) CHEMICAL SENSOR, REAGENT, AND METHOD FOR DETECTING BENZOIC ACID AND BENZOIC ACID DERIVATIVE

(71) Applicant: KABUSHIKI KAISHA TOSHIBA, Tokyo (JP)

(72) Inventors: Hiroko Miki, Kawasaki Kanagawa (JP); Yoshiaki Sugizaki, Fujisawa Kanagawa (JP); Hideyuki Tomizawa, Kita Tokyo (JP)

(73) Assignee: KABUSHIKI KAISHA TOSHIBA, Kawasaki Kanagawa (JP)

( * ) Notice: Subject to any disclaimer, the term of this patent is extended or adjusted under 35 U.S.C. 154(b) by 174 days.

(21) Appl. No.: 18/484,919

(22) Filed: Oct. 11, 2023

(65) Prior Publication Data

US 2024/0280529 A1   Aug. 22, 2024

(30) Foreign Application Priority Data

Feb. 20, 2023   (JP) .................................. 2023-024419

(51) Int. Cl.
*G01N 27/327*   (2006.01)
(52) U.S. Cl.
CPC ............... *G01N 27/3275* (2013.01)

(58) Field of Classification Search
CPC .... G01N 27/3275; G01N 27/00; G01N 27/26; G01N 27/28; G01N 27/30; G01N 27/327; G01N 27/3276; G01N 27/4145; G01N 27/414

See application file for complete search history.

(56) References Cited

U.S. PATENT DOCUMENTS

| | | | |
|---|---|---|---|
| 2018/0119209 A1 | 5/2018 | Arimoto | |
| 2021/0364466 A1* | 11/2021 | Longo | G01N 27/4146 |
| 2022/0170920 A1* | 6/2022 | Ionescu | G01N 27/4146 |

FOREIGN PATENT DOCUMENTS

JP         2018-74995 A       5/2018

OTHER PUBLICATIONS

Chen et al. ACS Nano 2022 16 (12), 20922-20936 (Year: 2022).*

* cited by examiner

*Primary Examiner* — Gurpreet Kaur
(74) *Attorney, Agent, or Firm* — Finnegan, Henderson, Farabow, Garrett & Dunner, LLP

(57) ABSTRACT

A chemical sensor includes a sensor element; a first electrode electrically connected to the sensor element; a second electrode electrically connected to the sensor element; an aptamer located on a surface of the sensor element; a solution covering the surface of the sensor element and the aptamer; and a tropane derivative having a tropane skeleton and contained in the solution.

8 Claims, 6 Drawing Sheets

CHEMICAL SENSOR, REAGENT, AND METHOD FOR DETECTING BENZOIC ACID AND BENZOIC ACID DERIVATIVE

CROSS-REFERENCE TO RELATED APPLICATION

This application is based upon and claims the benefit of priority from Japanese Patent Application No. 2023-024419, filed on Feb. 20, 2023; the entire contents of which are incorporated herein by reference.

FIELD

Embodiments described herein relate generally to a chemical sensor, a reagent, and a method for detecting a benzoic acid and a benzoic acid derivative.

BACKGROUND

For example, JP2018-74995A proposes a cocaine aptamer capable of detecting cocaine.

DETAILED DESCRIPTION

Figure 1:
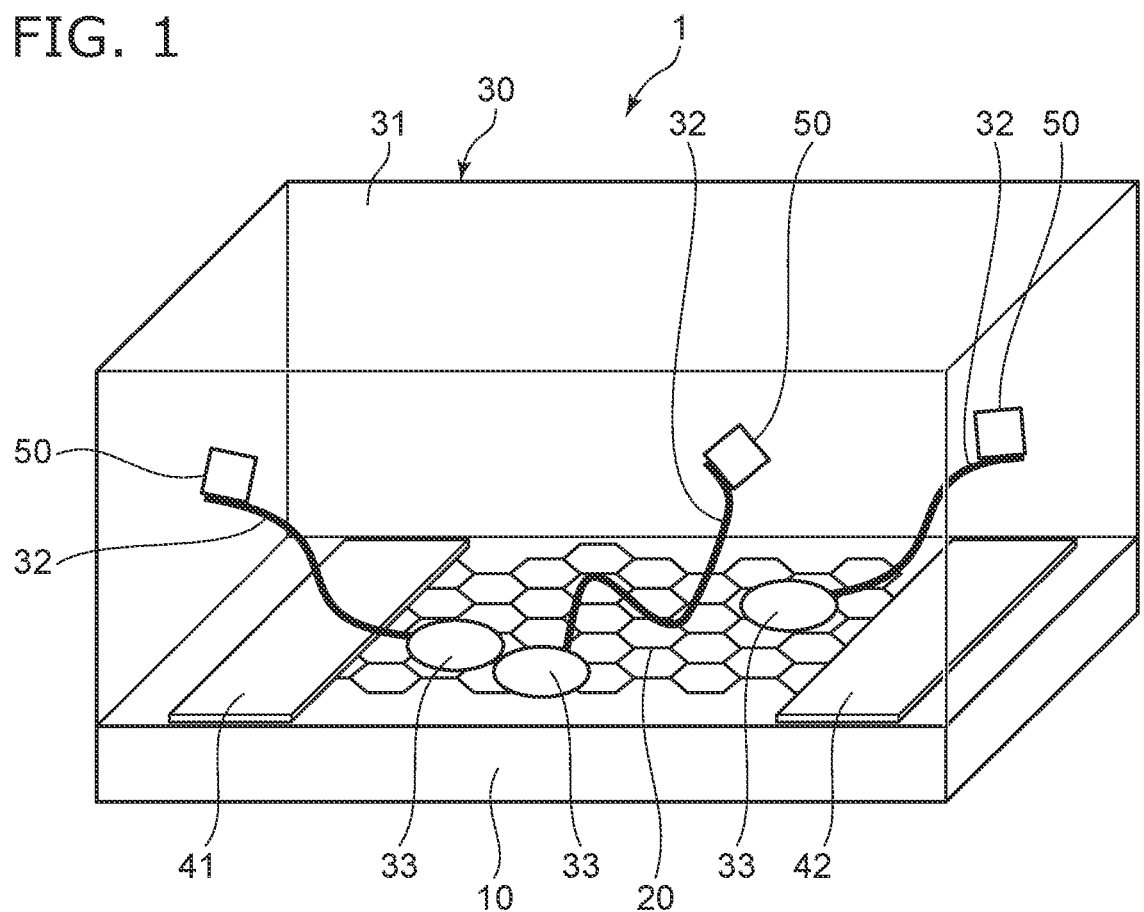
FIG. 1 is a schematic view showing a chemical sensor of an embodiment.

According to one embodiment, a chemical sensor includes a sensor element; a first electrode electrically connected to the sensor element; a second electrode electrically connected to the sensor element; an aptamer located on a surface of the sensor element; a solution covering the surface of the sensor element and the aptamer; and a tropane derivative having a tropane skeleton and contained in the solution.

According to one embodiment, a reagent includes a solution; an aptamer contained in the solution; and a tropane derivative having a tropane skeleton and contained in the solution.

According to one embodiment, a method for detecting a benzoic acid and a benzoic acid derivative includes bringing a specimen into contact with a reagent covering a surface of a sensor element, the reagent containing a solution, an aptamer contained in the solution and located on the surface of the sensor element, and a tropane derivative having a tropane skeleton and contained in the solution; and detecting a benzoic acid or a benzoic acid derivative based on a change in electrical characteristic of the sensor element.

Hereinafter, embodiments will be described with reference to the drawings.

The drawings are schematic or conceptual. A relationship between a thickness and a width of each portion, a ratio of sizes between portions, and the like are not necessarily the same as the actual ones. Even if the same portions are shown, dimensions and ratios may be shown differently from each other in the drawings.

Same or similar components are denoted by same reference numerals.

As shown in FIG. 1, a chemical sensor 1 of the embodiment includes a sensor element 20, a first electrode 41 electrically connected to the sensor element 20, and a second electrode 42 electrically connected to the sensor element 20. The sensor element 20, the first electrode 41, and the second electrode 42 are supported on a substrate 10.

The chemical sensor 1 has, for example, a field effect transistor (FET) structure. One of the first electrode 41 and the second electrode 42 functions as a drain electrode, and the other functions as a source electrode. A current flows between the first electrode 41 and the second electrode 42 through the sensor element 20.

The sensor element 20 is, for example, graphene. The substrate 10 is, for example, a silicon substrate. The graphene can be provided, for example, on the substrate 10 with a foundation film (not shown) therebetween. As the foundation film, for example, a silicon oxide film can be used. The foundation film may also function as a chemical catalyst for forming graphene.

The chemical sensor 1 further includes a reagent 30. The reagent 30 contains a solution 31, aptamers 32 contained in the solution 31, and a tropane derivative having a tropane skeleton and contained in the solution 31.

The aptamer 32 is, for example, a cocaine aptamer. The cocaine aptamer is a nucleic acid aptamer capable of specifically recognizing a cocaine molecule or capable of specifically interacting with a cocaine molecule. The cocaine aptamer has, for example, a three-dimensional structure called a three-way junction. The aptamers 32 are located on a surface of the sensor element 20 via, for example, linkers (or scaffold molecules) 33. For example, pyrene can be used as the linker 33. The expression "the aptamers 32 are located on a surface of the sensor element 20" means that the aptamers 32 are bonded to, adsorbed to, or contiguous to the surface of the sensor element 20 by chemicals, attraction due to electric charges, hydrophobic interaction, or the like, and the aptamers 32 are restrained on the surface of the sensor element 20.

Figure 3A:
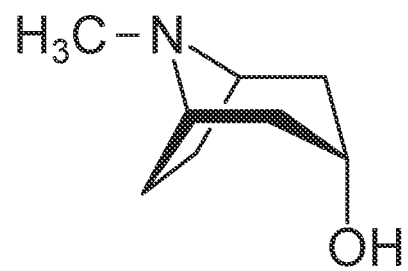
FIGS. 3A to 3C are structural formulae of a tropane derivative.
Figure 3B:
Figure 3C:
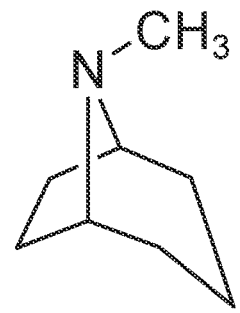

The tropane derivative is, for example, tropine, tropinone, or tropane. FIG. 3A shows a structural formula of tropine, FIG. 3B shows a structural formula of tropinone, and FIG. 3C shows a structural formula of tropane. The tropane derivative includes a molecule modified with tropine, tropinone, or tropane. Alternatively, the tropane derivative includes a molecule obtained by oxidizing or reducing tropine, tropinone, or tropane.

The surface of the sensor element 20 and the aptamers 32 are immersed in the solution 31. The solution 31 is, for example, an aqueous solution. In the example, the solution 31 is, for example, a buffer solution.

The first electrode 41 and the second electrode 42 are covered with an insulating film (not shown) such that the first electrode 41 and the second electrode 42 are not in direct contact with the reagent 30. If necessary, the surface of the graphene may be covered with an insulator such as a phospholipid film.

When the aptamer 32 recognizes or captures a target substance 50, the target substance 50 is contiguous to the surface of the sensor element 20, and thus an electronic state of the sensor element 20 changes due to charges possessed by the target substance 50 and a structural change of the aptamer 32 caused by capturing the target substance 50. By detecting this as a change in current flowing between the first electrode 41 and the second electrode 42, the presence and a concentration of a target substance in a specimen can be known. In the embodiment, the target substance 50 is benzoic acid or a benzoic acid derivative, as to be described later. Methyl benzoate is described as an example of the benzoic acid derivative. Although the specimen is described as a specimen atmosphere, the specimen may be a specimen liquid.

Figure 2:
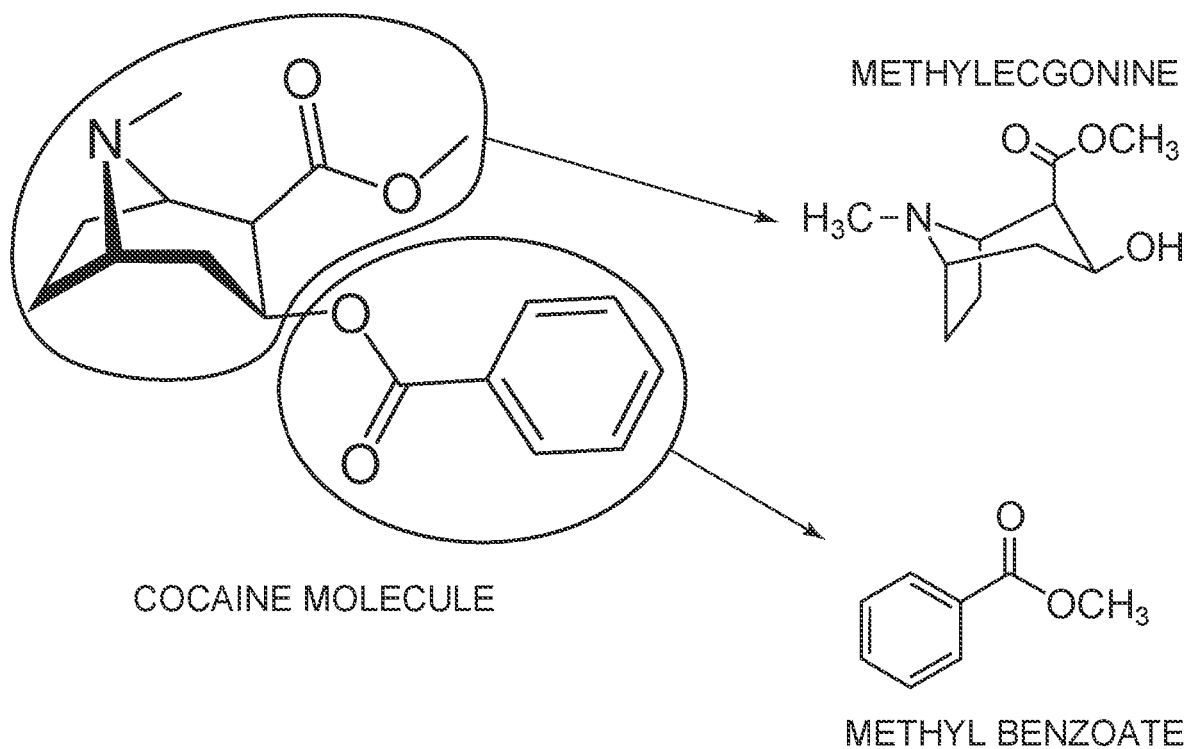
FIG. 2 is a structural formula of a cocaine molecule.

According to the embodiment, an object is to detect the presence of a cocaine molecule in a specimen atmosphere using the chemical sensor 1. FIG. 2 shows a structural formula of the cocaine molecule. Although the cocaine molecule is nonvolatile, the cocaine molecule is separated into a tropane derivative and a benzoic acid derivative that constitute the cocaine molecule, and each volatilize. The tropane derivative is, for example, methylecgonine, and the benzoic acid derivative is, for example, methyl benzoate. Depending on decomposition conditions of the cocaine molecule, structures of the volatile tropane derivative and benzoic acid derivative are different. Therefore, according to the embodiment, the presence of the cocaine molecule in the specimen atmosphere is indirectly detected by bringing the specimen atmosphere into contact with the reagent 30 and detecting methyl benzoate based on a change in electrical characteristic of the sensor element 20. In the case where benzoic acid or a benzoic acid derivative is produced by decomposition of a cocaine analogue, the presence of the cocaine analogue can be indirectly detected according to the embodiment. According to the embodiment, detection of benzoic acid and a benzoic acid derivative themselves can be implemented with high selectivity. The benzoic acid derivative includes benzoic acid, a benzoic acid ester, a benzoic acid reduced product, and a modified substance thereof. The benzoic acid derivative may include a structure modified with a benzene ring. The benzoic acid derivative may be a salt.

The above-described cocaine aptamer 32 has a low affinity for methyl benzoate since it is designed for the cocaine molecule.

Methylecgonine is a regulated substance. According to the embodiment, by using the reagent 30 obtained by adding, to the solution 31, a tropane derivative which is a general pharmaceutical product having a molecular structure close to that of methylecgonine, detection sensitivity of methyl benzoate by the aptamer 32 is increased.

Since the cocaine molecule has a molecular structure in which methyl benzoate and methylecgonine are bonded to each other, an affinity between the aptamer 32 and methyl benzoate can be increased by adding in advance to the reagent 30 the tropane derivative having a molecular structure close to that of methylecgonine.

It is considered that for a cocaine molecule capture site in the aptamer 32, the presence of the tropane derivative having a molecular structure close to that of methylecgonine makes it easier for methyl benzoate to stably stay in the cocaine molecule capture site in the aptamer 32 than methyl benzoate alone. The tropane derivative functions as an auxiliary ligand for enhancing the affinity between the aptamer 32 and methyl benzoate.

Next, results of evaluation of the affinity between the cocaine aptamer and methyl benzoate (or tropine) by isothermal titration calorimetry (ITC) will be described.

Comparative Example 1

A methyl benzoate solution obtained by dissolving methyl benzoate in a phosphate buffered saline and a cocaine aptamer solution obtained by dissolving a cocaine aptamer in PBS were prepared. D-PBS(−) was used as the phosphate buffered saline. A molar concentration of methyl benzoate in the methyl benzoate solution was 1 mM. A molar concentration of the cocaine aptamer in the cocaine aptamer solution was 50 μM. An ITC measurement was performed with the methyl benzoate solution being put as a titrant into a titration syringe and the cocaine aptamer solution being put as a liquid to be titrated into a sample cell.

Figures 4A, 4B:
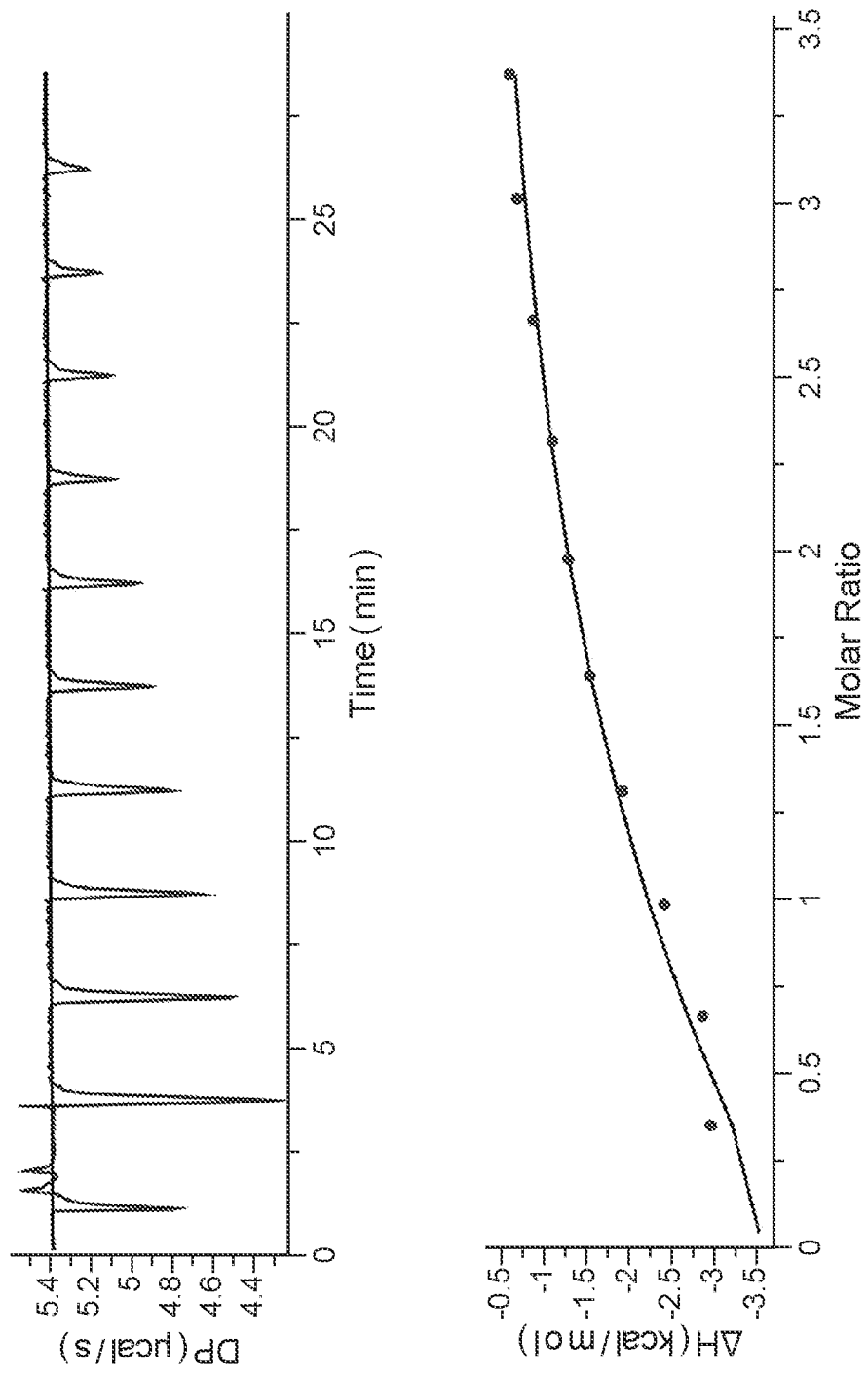
FIG. 4A shows ITC raw data in Comparative Example 1.
FIG. 4B shows ITC analysis data in Comparative Example 1.

FIG. 4A shows ITC raw data in Comparative Example 1. A horizontal axis represents a time, and a vertical axis represents a difference from a base value of input heat quantity. Based on the obtained raw data, a molar ratio of methyl benzoate/cocaine aptamer (a horizontal axis) and an enthalpy change (a vertical axis) were plotted as shown in FIG. 4B. Further, a dissociation constant Kd was determined by performing polynomial fitting using a theoretical equation of a binding model with a binding order being 1. The dissociation constant Kd in Comparative Example 1 was $87.7 \times 10^{-6}$ (M).

Example 1

A solution A was prepared by dissolving tropine in D-PBS(−). A molar concentration of tropine in the solution A was 10 μM. Using the solution A as a solvent, a methyl benzoate solution and a cocaine aptamer solution were prepared. A molar concentration of methyl benzoate in the methyl benzoate solution was 1 mM. A molar concentration of the cocaine aptamer in the cocaine aptamer solution was 50 μM. Then, an ITC measurement was performed with the methyl benzoate solution being put as a titrant into a titration syringe and the cocaine aptamer solution being put as a liquid to be titrated into a sample cell.

Figure 5A:
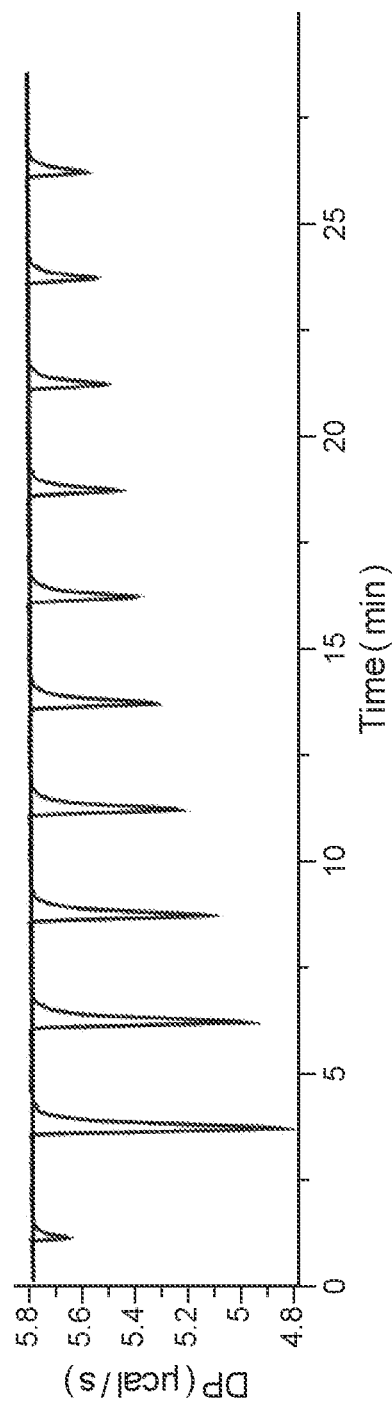
FIG. 5A shows ITC raw data in Example 1.
Figure 5B:
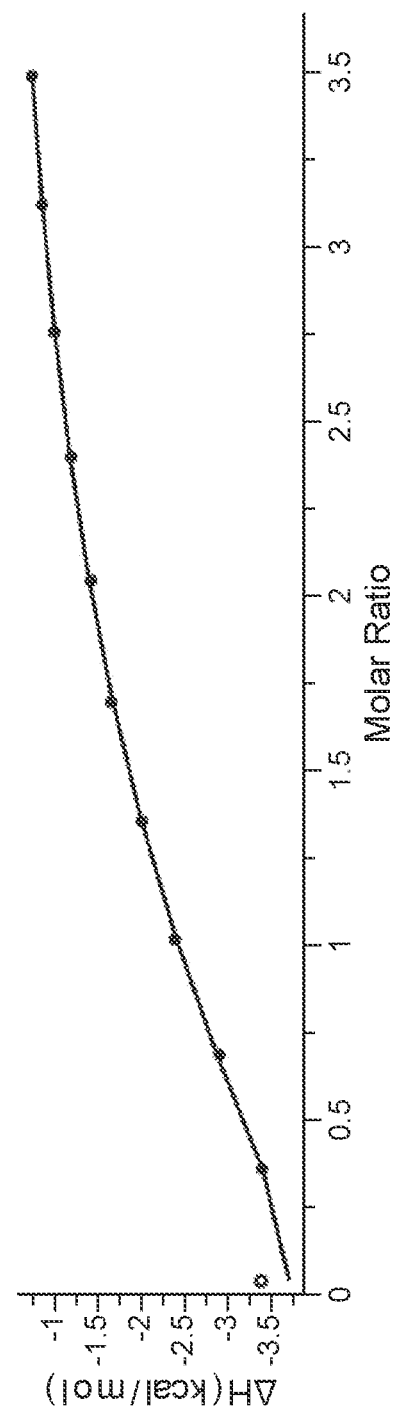
FIG. 5B shows ITC analysis data in Example 1.

FIG. 5A shows ITC raw data in Example 1. A horizontal axis represents a time, and a vertical axis represents a difference from a base value of input heat quantity. Based on the obtained raw data, a molar ratio of methyl benzoate/cocaine aptamer (a horizontal axis) and an enthalpy change (a vertical axis) were plotted as shown in FIG. 5B. Further, a dissociation constant Kd was determined by performing polynomial fitting using a theoretical equation of a binding model. The dissociation constant Kd in Example 1 was $69.7 \times 10^{-6}$ (M).

By adding tropine, the dissociation constant Kd in Example 1 was smaller than that in Comparative Example 1, that is, an affinity between methyl benzoate and the cocaine aptamer could be increased. In Example 1, fitting accuracy could be increased and accuracy of the obtained dissociation constant Kd could also be increased, as compared with Comparative Example 1.

Example 2

A solution B was prepared by dissolving tropinone in D-PBS(−). A molar concentration of tropinone in the solution B was 10 μM. Using the solution B as a solvent, a methyl benzoate solution and a cocaine aptamer solution were prepared, respectively. A molar concentration of methyl benzoate in the methyl benzoate solution was 1 mM. A molar concentration of the cocaine aptamer in the cocaine aptamer solution was 50 μM. Then, an ITC measurement was performed with the methyl benzoate solution being put as a titrant into a titration syringe and the cocaine aptamer solution being put as a liquid to be titrated into a sample cell.

Figure 6A:
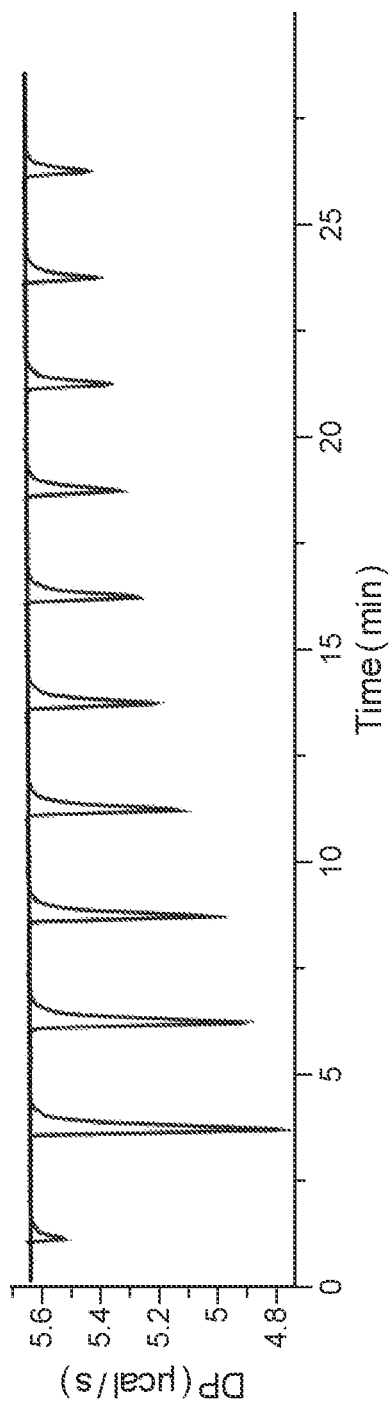
FIG. 6A shows ITC raw data in Example 2.
Figure 6B:
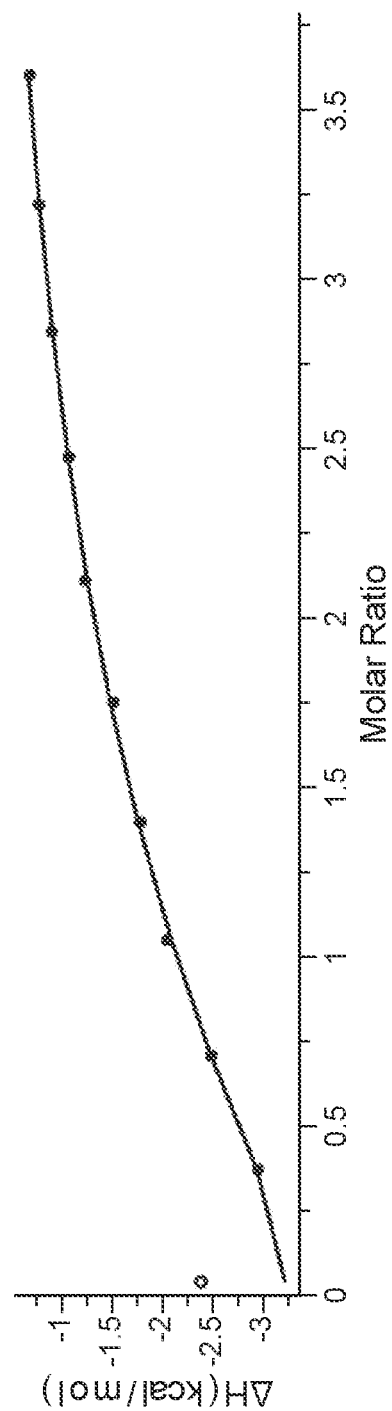
FIG. 6B shows ITC analysis data in Example 2.

FIG. 6A shows ITC raw data in Example 2. A horizontal axis represents a time, and a vertical axis represents a difference from a base value of input heat quantity. Based on the obtained raw data, a molar ratio of methyl benzoate/cocaine aptamer (a horizontal axis) and an enthalpy change (a vertical axis) were plotted as shown in FIG. 6B. In Example 2, fitting accuracy could be increased as compared with Comparative Example 1.

Example 3

A solution C was prepared by dissolving tropane in D-PBS(−). A molar concentration of tropane in the solution C was 10 μM. Using the solution C as a solvent, a methyl benzoate solution and a cocaine aptamer solution were prepared. A molar concentration of methyl benzoate in the methyl benzoate solution was 1 mM. A molar concentration of the cocaine aptamer in the cocaine aptamer solution was 50 μM. Then, an ITC measurement was performed with the methyl benzoate solution being put as a titrant into a titration syringe and the cocaine aptamer solution being put as a liquid to be titrated into a sample cell.

Figure 7A:
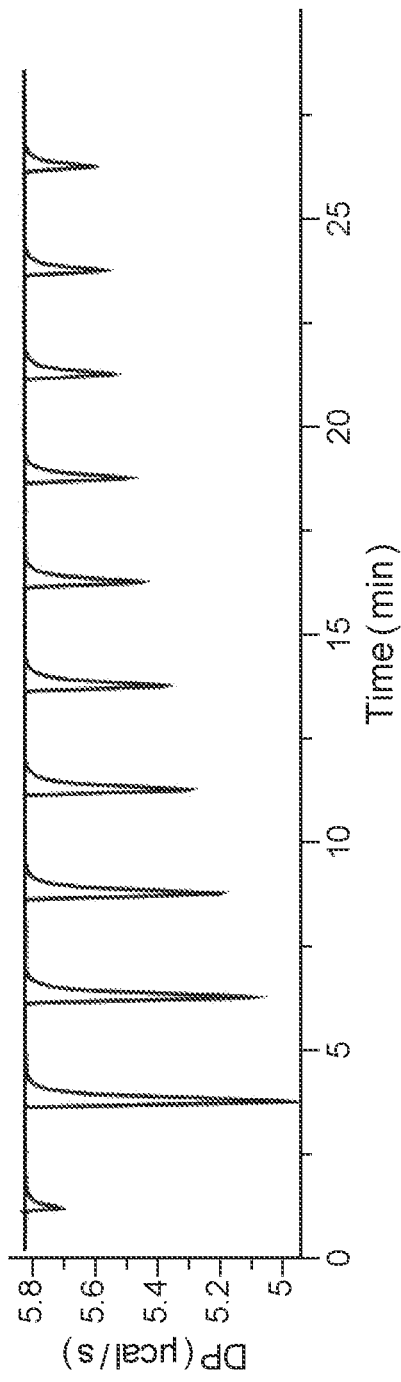
FIG. 7A shows ITC raw data in Example 3.
Figure 7B:
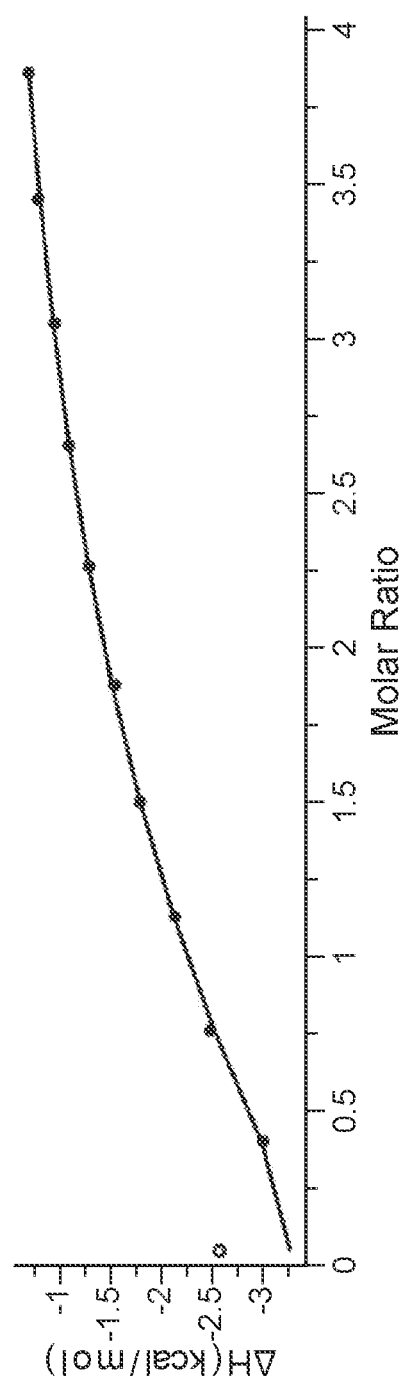
FIG. 7B shows ITC analysis data in Example 3.

FIG. 7A shows ITC raw data in Example 3. A horizontal axis represents a time, and a vertical axis represents a difference from a base value of input heat quantity. Based on the obtained raw data, a molar ratio of methyl benzoate/cocaine aptamer (a horizontal axis) and an enthalpy change (a vertical axis) were plotted as shown in FIG. 7B. In Example 3, fitting accuracy could be increased as compared with Comparative Example 1.

Comparative Example 2

A tropine solution obtained by dissolving tropine in D-PBS(−) and a cocaine aptamer solution obtained by dissolving a cocaine aptamer in D-PBS(−) were prepared. A molar concentration of tropine in the tropine solution was 1 mM. A molar concentration of the cocaine aptamer in the cocaine aptamer solution was 50 μM. An ITC measurement was performed with tropine solution being put as a titrant into a titration syringe and the cocaine aptamer solution being put as a liquid to be titrated into a sample cell.

As a result of the ITC measurement in Comparative Example 2, no heat generation was observed. Accordingly, the cocaine aptamer has a low affinity for tropine.

Comparative Example 3

A solution D was prepared by dissolving methyl benzoate in D-PBS(−). A molar concentration of methyl benzoate in the solution D was 10 μM. Using the solution D as a solvent, a tropine solution and a cocaine aptamer solution were prepared, respectively. A molar concentration of tropine in the tropine solution was 1 mM. A molar concentration of the cocaine aptamer in the cocaine aptamer solution was 50 μM. Then, an ITC measurement was performed with the tropine solution being put as a titrant into a titration syringe and the cocaine aptamer solution being put as a liquid to be titrated into a sample cell.

As a result of the ITC measurement in Comparative Example 3, no heat generation was observed. That is, in capturing tropine by the cocaine aptamer, methyl benzoate does not function as an auxiliary ligand for enhancing the affinity between the cocaine aptamer and tropine. A capture site of the cocaine aptamer is hydrophobic. When the auxiliary ligand is hydrophilic, the auxiliary ligand can move in and out of the capture site of the cocaine aptamer. However, it is considered that since methyl benzoate is hydrophobic, methyl benzoate aggregates in the capture site of the cocaine aptamer, making it difficult for hydrophilic tropine to move in the capture site of the cocaine aptamer. Therefore, the auxiliary ligand for increasing the affinity between the cocaine aptamer and the target substance in the reagent is favorably hydrophilic.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A chemical sensor comprising:
    a sensor element;
    a first electrode electrically connected to the sensor element;
    a second electrode electrically connected to the sensor element;
    an aptamer located on a surface of the sensor element;
    a solution covering the surface of the sensor element and the aptamer, the solution contacting a specimen atmosphere; and
    a tropane derivative having a tropane skeleton and contained in the solution,
    the chemical sensor detecting methyl benzoate based on a change in electrical characteristic of the sensor element.

2. The chemical sensor according to claim 1, wherein the sensor element is graphene.

3. The chemical sensor according to claim 1, wherein the aptamer is a cocaine aptamer.

4. The chemical sensor according to claim 1, wherein the tropane derivative is tropine, tropinone, or tropane.

5. A method for detecting a benzoic acid and a benzoic acid derivative, comprising:
    bringing a specimen into contact with a reagent covering a surface of a sensor element, the reagent containing a solution, an aptamer contained in the solution and located on the surface of the sensor element, and a tropane derivative having a tropane skeleton and contained in the solution; and
    detecting a benzoic acid or a benzoic acid derivative based on a change in electrical characteristic of the sensor element.

6. The method according to claim 5, wherein the sensor element is graphene.

7. The method according to claim 5, wherein the aptamer is a cocaine aptamer.

8. The method according to claim 5, wherein the tropane derivative is tropine, tropinone, or tropane.

* * * * *